March 7, 1939.    W. AHLERT    2,150,045
PROCESS OF WELDING METALS

Filed Jan. 6, 1936

INVENTOR,
Wilhelm Ahlert
BY
Henry C. Parker
ATTORNEY

Patented Mar. 7, 1939

2,150,045

UNITED STATES PATENT OFFICE 2,150,045

PROCESS OF WELDING METALS

Wilhelm Ahlert, Berlin-Tempelhof, Germany

Application January 6, 1936, Serial No. 57,864
In Germany January 5, 1935

7 Claims. (Cl. 22—204)

(Granted under the provisions of sec. 14, act of
March 2, 1927; 357 O. G. 5)

This invention relates to a process of welding metals and the main object of the invention is to provide an improved method of uniting metals by the so called aluminothermic process, applying a higher temperature to the welding spot than heretofore practiced and further in protecting the spot with a cover in order to prevent a deformation by this higher temperature, which is above the melting point of the metal.

It has been the common practice in the welding of metals by the aluminothermic process to pour superheated molten slag over the ends of the metal pieces brought into contact and after reaching the welding-temperature squeezing them together. This could be done with or without preheating the metal pieces.

It is further known to weld work pieces by means of the so called aluminothermic fusion weld, i. e., by arranging a gap between the ends to be united and filling up this gap with superheated aluminogenetic metal. This metal poured in between, partly fuses with the material of the work pieces making a solid joint.

The first mentioned method may be advantageously employed for work pieces of steel with a low content of carbon since the melting point of such material is proportionally high and the welding temperature is below this point. The welding is accordingly effected by compressing the parts together while in a solid state. With steel of a higher percentage of carbon a different method is advantageous, because the material, on account of its lower melting point, tends to fuse, especially on its surface and corners before a welding heat is reached in the interior of the objects to be welded. A satisfactory weld of material containing above 0.9 per cent carbon is more readily accomplished in a fused state of the material.

It has been heretofore the practice in the art of butt welding harder material, that is, material containing a higher percentage of carbon to make the mold in such a manner that the parts of the welding objects, which were most likely to become fused and to get out of shape, were closely covered by parts of the mold, thus preventing the hot gases from the charge from coming in contact with the material and also keeping the superheated slag away from the endangered parts of the joint. It is obvious that considerable skill was required in making a satisfactory weld by this method. Our present invention, in which the butted ends of the objects are fused together, can be accomplished much more readily.

Pieces of hard steel have been welded in the prior art by use of the mentioned fusion weld by or intermediate casting. But there are several drawbacks to the fusion weld, in that it is impossible to avoid a dissolution of the work material to a width of ½" to 2" and even more and that the metal poured in between and partly fused with the work material is not always of the same hardness and resistance to wear as the work piece itself.

It has been attempted in the art of making a fusion weld to squeeze the intermediate aluminogenetic material and the fused parts of the welded object out of the gap while in a liquid state, in order to get a homogeneous weld, but this could not be done satisfactorily because of the irregular surfaces of the partly molten ends of the work pieces.

In my new process of welding, the objects to be welded are butted tight together and the welding spot, after being surrounded with a suitable mold and sufficiently preheated, i. e., to a higher temperature than heretofore practiced, are covered by a heat-conducting cap and further heated by pouring superheated slag over them, the slag being at such a temperature that the material of the joint becomes liquid and the ends of the objects to be welded are fused into a single piece, a thorough joining moreover being aided by pressing or moving the said ends together.

The higher temperature applied in my new method may be obtained either by using a larger quantity of aluminothermic material, or by applying a higher temperature to the work pieces during preheating, or by preheating to a higher temperature and simultaneously using a larger quantity of aluminothermic material, or finally by the use of an aluminothermic material with a greater heating effect.

A deformation of the work pieces which might be brought on by the extreme heating of the material above its melting point, is prevented in my new method by using a cover, made of sand, ceramic material or other refractory, or it may be of sheet iron or a combination of metal and refractory material. This cover, or protecting cap, is made to fit over the parts of the work pieces which are most likely to be fused and to get out of shape.

The cover is tightly fitted on the red hot parts to be welded directly after the preheating is finished before the slag is poured over. The slag, which has an extremely high melting point, becomes solid instantly when it touches the cold cap and in this way builds a true shaped mold having the outlines of the workpieces. Even when the cover itself is entirely destroyed by the extreme heat, the solidified slag keeps its shape and prevents any deformation of the workpieces which are, as intended, partly liquefied. This fact has been proved by a series of experiments.

The principal application of the aluminothermic welding is the welding of rails for railways and tramways. In welding rails a process is preferred consisting in a combination of butt-welding and fusion welding, characterized by the fact, that the heads of the rails are butted together and heated by the aluminogenetic slag to a welding heat, while the feet and webs of the rails are simultaneously fusion-welded by the superheated aluminogenetic iron. This old process does not give entire satisfaction if high carbon rail material is to be welded because the butt weld of the rails heads will not have sufficient strength, as mentioned before. Therefore, since modern practice now calls for high-carbon rail material of greater strength and wear resistance, my new process is of great advantage for rail welding.

My new process has the advantage over prior art methods that an absolutely certain fusion of the rail heads into a homogeneous piece is obtained, a further advantage being that it is no longer necessary to machine the rail ends accurately square and to true parallelism.

In comparison with the old known fusion welding process my new method has the great advantage that the whole joint, i. e., the welded spot, is of the same composition as that of any other part of the rail, with the same properties as regards wear and hardness. This is of greatest importance because a cupping at the weld caused by traffic is eliminated.

In order to give a clear understanding of my improved method, a process of rail welding will be described. Reference is made to the accompanying drawing, in which.

Figure 1:
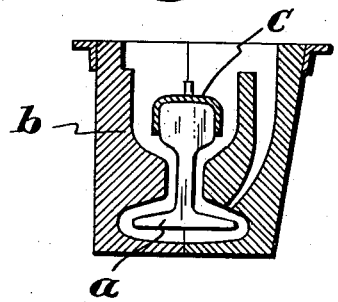
Fig. 1 shows a vertical cross-section of the rails *a* to be welded, with a mold *b* surrounding the rail joint. The head of the rail is covered by the cover or protection cap *c*.
Figure 2:
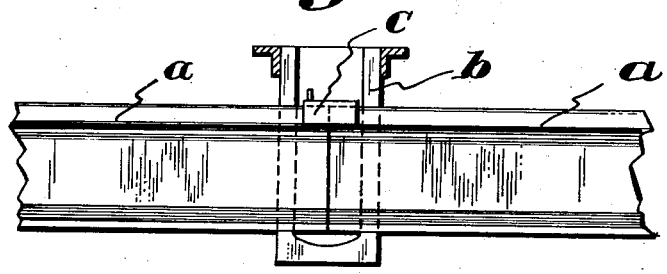
Fig. 2 is an elevational view of the rails *aa* with one section of the two part mold removed.
Figure 3:
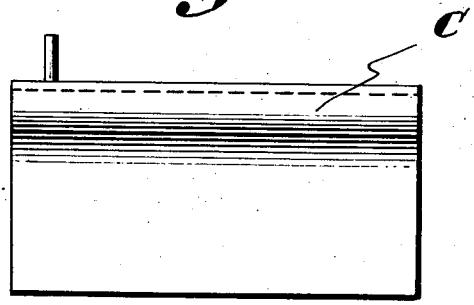
Figs. 3 and 4 show the cover or protection cap in natural size.
Figure 4:
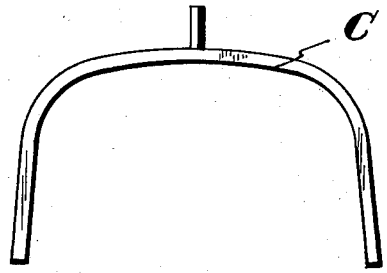

The rails *aa* to be welded are butted together and held in juxtaposition by clamps which press the rail ends against each other. After the joint is surrounded by a suitable mold *b*, made in two parts, the rail ends and also the inside of the mold is preheated by a gasoline torch in a manner heretofore known but to a temperature higher than that employed with the old method. The most suitable temperature to employ is determined for each special material by experiment. After the maximum temperature of the preheating is reached the cold cover *c* is placed on the red hot rail head and immediately the reaction in a separate aluminothermic crucible (not shown) is started and the alumino-thermic liquid mass is then poured into the mold *b*.

The composition and quality of the aluminothermic mass is chosen in such a way that, in combination with the preheating, the total amount of heat imparted to the rail heads is sufficient to bring them to a liquid state.

After 3 to 5 minutes when the rail heads have reached their maximum temperature it is of advantage to press them together thus squeezing out impurities and blow holes. If necessary the process can also be executed when the rail ends have been previously machined or when a shim is inserted between the rail ends.

Other modifications of my process within the scope of the following claims will be immediately evident to those skilled in the art.

What I claim is:

1. In the welding of metal parts, the process which comprises abutting metal parts to be welded, forming a mold around the resulting joint, at least partially covering the said joint with a heat-conducting cap conforming to the shape of said joint and of such character as to produce solidification of the slag of an aluminothermic charge contacted therewith, then contacting the so-protected joint with an aluminothermic charge in such manner that the slag congeals on said cover thus producing a form-fitting mold while fusion of said metal parts at the joint is produced by the heat of said charge, the said protecting cover being so constructed and arranged as to permit passage therethrough of sufficient heat to produce fusion of said parts.

2. The process of claim 1 wherein the aluminothermic charge employed is insufficient of itself to produce the said fusion of the parts of said joint but said joint is preheated to such an extent that fusion takes place.

3. The process of claim 1 wherein the joint is preheated to a normal extent but wherein a larger aluminothermic charge than usual is employed, this charge being sufficient to produce fusion of said parts.

4. The process of claim 1 which includes the step of pressing together the said metal parts while said parts are in the fused state.

5. The process of claim 1 wherein said cover is made of a combination of metal and refractory material.

6. In the welding of steel rails by the aluminothermic method, the process which comprises abutting the ends of such rails, forming a mold around the resulting joint, placing over the said joint a heat-conducting, protecting cover conforming to and substantially covering at least the rail heads, contacting the so-protected joint with an aluminothermic charge in such manner that the slag congeals over said cover while fusion of the rails at the joint is produced by the heat of said charge, the said protecting cover being so constructed and arranged as to permit passage therethrough of sufficient heat to produce fusion of the rails at said joint.

7. The process of claim 6 wherein said joint is preheated to high temperatures before being contacted with said aluminothermic charge and wherein said rails are pressed together while their abutted ends are in the fused state.

WILHELM AHLERT.